United States Patent [19]

Sato et al.

[11] Patent Number: 5,173,313

[45] Date of Patent: Dec. 22, 1992

[54] ROLL-STAMPER FOR FORMING SUBSTRATE OF INFORMATION-RECORDING MEDIUM

[75] Inventors: Tetsuya Sato; Osamu Kanome; Hitoshi Yoshino; Hisanori Hayashi, all of Kawasaki; Hirofumi Kamitakahara, Yokohama, all of Japan

[73] Assignee: Canon Kabushiki Kaisha, Tokyo, Japan

[21] Appl. No.: 658,688

[22] Filed: Feb. 21, 1991

[30] Foreign Application Priority Data

Feb. 22, 1990 [JP] Japan .................................. 2-39758

[51] Int. Cl.⁵ ........................ B29C 43/46; B29D 17/00
[52] U.S. Cl. .................................. 425/183; 425/194; 425/363; 425/367; 425/385; 425/810; 264/1.3; 264/1.6; 264/106
[58] Field of Search ............... 264/106, 1.3, 107, 1.6; 425/183, 193, 194, 195, 369, 374, 385, 810, 363, DIG. 44, 367; 100/155 R

[56] References Cited

U.S. PATENT DOCUMENTS

| | | |
|---|---|---|
| 3,072,519 | 1/1963 | Salzman .......................... 425/810 |
| 3,387,330 | 6/1968 | Lemelson ........................ 425/385 |
| 3,874,836 | 4/1975 | Johnson et al. ................. 425/810 |
| 3,893,795 | 7/1975 | Nauta ............................. 425/385 |
| 4,211,743 | 7/1980 | Nauta et al. .................... 425/385 |
| 4,746,220 | 5/1988 | Sukai et al. .................... 425/183 |
| 4,790,893 | 12/1988 | Watkins ......................... 264/1.3 |
| 4,836,874 | 6/1989 | Foster ............................. 364/1.3 |
| 5,048,745 | 9/1991 | Sato et al. ...................... 364/106 |

FOREIGN PATENT DOCUMENTS 457604  3/1975  U.S.S.R. ........................ 425/385

Primary Examiner—Jay H. Woo
Assistant Examiner—Khanh P. Nguyen
Attorney, Agent, or Firm—Fitzpatrick, Cella, Harper & Scinto

[57] ABSTRACT

A roll-stamper for forming substrates of an information-recording medium includes at least one stamper being fastened along a peripheral face of a mirror roller, carrying on a surface thereof patterns each corresponding to a preformat for an information recording medium, also having stoppers fixed along both edges on the reverse side thereof, and being fastened to the mirror roller by inserting the stoppers respectively into negative stopping-grooves cut into the mirror roller in parallel with the axis of the mirror roller.

31 Claims, 6 Drawing Sheets

ROLL-STAMPER FOR FORMING SUBSTRATE OF INFORMATION-RECORDING MEDIUM

BACKGROUND OF THE INVENTION

1. Field of the Invention

The present invention relates to a roll-stamper, which is employed for transferring a preformat pattern onto a surface of a substrate material in continuous production of a substrate of high-density information recording medium such as optical discs, optical cards, and the like. The present invention also relates to a molding apparatus employing the roll-stamper for forming substrates for an information recording medium.

2. Related Background Art

Substrates for a high-density optical information recording medium such as optical discs and optical cards can be produced by injection molding, compression molding, or extrusion molding.

The injection molding and the compression molding have disadvantages in that they require certain conditions of the pressure, the temperature of the molten resin and precision of the mold, etc. in order to achieve flatness and smoothness of the substrate, to prevent warp of the substrate, and to suppress the penetration of gas bubbles into the substrate. In addition, the molding machine is large-scaled and the production cost is high. Furthermore, the injection molding has difficulty in producing thin substrates (0.4 mm or less) such as optical cards. The compression molding is not highly productive since the sheets are treated one by one, post-treatment is troublesome, and much time is required for heating and cooling of the substrates.

On the contrary, the extrusion molding, which employs a compact molding machine, can form a substrate having a signal pattern such as preformat signal or tracking signal by extruding a resin sheet and pressing a roll-stamper onto the surface of the resin sheet without the above-mentioned inconvenience, and is suitable for mass production of the substrates. Accordingly, the substrates are generally produced by extrusion molding.

Conventional roll-stampers for forming substrates of information recording media are exemplified by those shown below:

(1) a sheet-type stamper having a preformed and engraved pattern on its surface is uniformly adhered on the peripheral face of a mirror roller (a roller having mirror-finished surface) with an adhesive; and (2) As shown in FIG. 8, a sheet-shaped stamper (81) having a preformed and engraved pattern on its surface is fastened, with screws onto the peripheral face of a mirror roller 82.

The roll-stamper prepared by the above-mentioned technique (1) has a disadvantage that its life is extremely short because the adhesive fastening the stamper deteriorates by the heat of the extruded resin sheet or the roll-stamper itself and the stamper is liable to peel off from the mirror roller. Further, it involves another disadvantage that bubbles are liable to be formed in the adhesive and the protrusions caused by the bubbles are unnecessarily transferred onto the substrate, which interferes with the precise transfer of the pattern resulting in transferred pattern defects.

On the other hand, the roll-stamper prepared by the technique of (2) above involves the disadvantage that unevenness or distortion at the screw-fixed positions may cause defective pattern transfer, or exert an uneven pressure onto the resin sheet, resulting in, for example, birefraction of the polycarbonate used as a resin.

The present invention solves the above-described disadvantages of the prior art.

SUMMARY OF THE INVENTION

An object of the present invention is to provide a long-life roll-stamper for the substrate-formation of an information-recording medium, which comprises a stamper carefully fast-fixed onto a peripheral face of a mirror roller, being capable of transferring a preformat pattern precisely onto a resin sheet.

Another object of the present invention is to provide an apparatus for producing substrates of an information-recording medium, which is capable of transferring a preformat pattern precisely onto a resin sheet without causing birefraction of the resin sheet.

A further object of the present invention is to provide a process for producing substrates of an information-recording medium, which is capable of transferring a preformat pattern precisely onto a resin sheet without causing birefraction of the resin sheet.

According to an aspect of the present invention, there is provided a roll-stamper for the substrate-formation of an information-recording medium, having stampers fastened along a peripheral face of a mirror roller, wherein each stamper is carrying on its surface patterns corresponding to a preformat for the information recording medium, and on the reverse side of the stamper, stoppers are fixed along the both edges thereof, and the stamper is fastened by inserting the stoppers respectively into the negative stopping-grooves cut in the peripheral face of the mirror roller parallel to the axis of the mirror roll.

According to another aspect of the present invention, there is provided an apparatus for producing continuously substrates of an information-recording medium comprising means for forming a resin sheet by extruding a resin, a roll-stamper carrying preformat patterns on the surface thereof to transfer the preformat patterns onto the resin sheet, and at least one pressure mirror roller opposed to the roll-stamper, wherein the roll-stamper comprises thin stampers, each of which has stoppers integrated along each edge on the back side thereof, and a mirror roller on which each stamper is fastened by inserting the stoppers respectively into the negative stopping-grooves cut into the peripheral face of the mirror roller parallel with the axis of the mirror roller.

According to a further aspect of the present invention, there is provided a process for continuously producing substrates of an optical information-recording medium, which comprises extruding a molten resin to form a resin sheet, and transferring a preformat pattern on the face of the resin sheet by pressing the resin sheet, before the resin sheet solidifies, between a pressure mirror roller and the opposed roll-stamper carrying the preformat patterns corresponding to a preformat, wherein the roll-stamper comprises thin stampers, each of which has stoppers integrated along each edge on the back side thereof and a mirror roller on which stampers are fastened by inserting the stoppers respectively into negative stopping-grooves cut into the peripheral face of the mirror roller parallel with the axis of the mirror roller.

The roll-stamper of the present invention, in which thin stampers are fastened mechanically on a peripheral face, does not peel off from the mirror roller during substrate production, and is capable of transferring a preformat pattern with high precision without the influence of a stopping device onto the surface state of the stamper and without causing birefraction in the resin sheet.

DESCRIPTION OF THE PREFERRED EMBODIMENT

The present invention is described in detail making reference to Figures.

Figure 1:
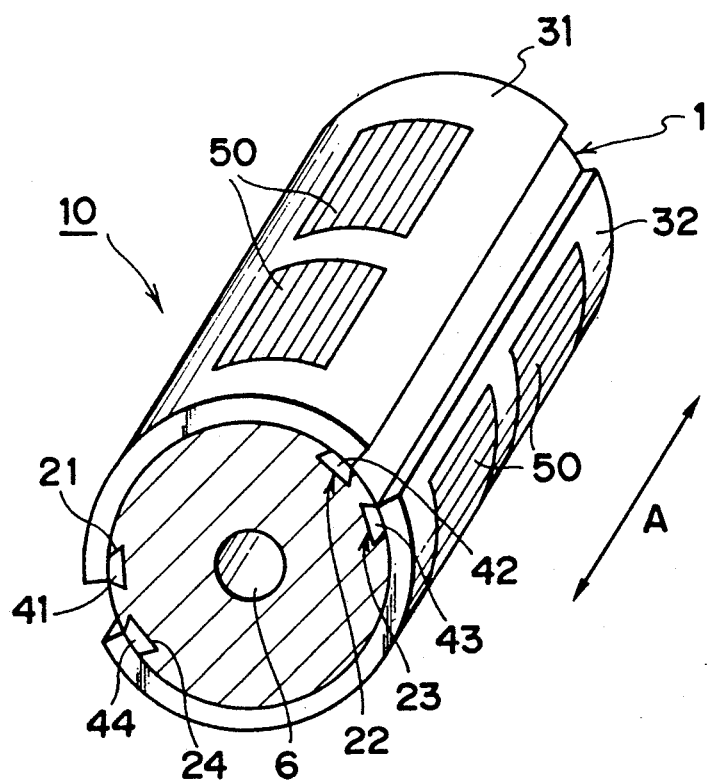
FIG. 1 roughly illustrates an oblique view of a roll-stamper of the present invention for forming substrates of optical cards.
Figure 2:
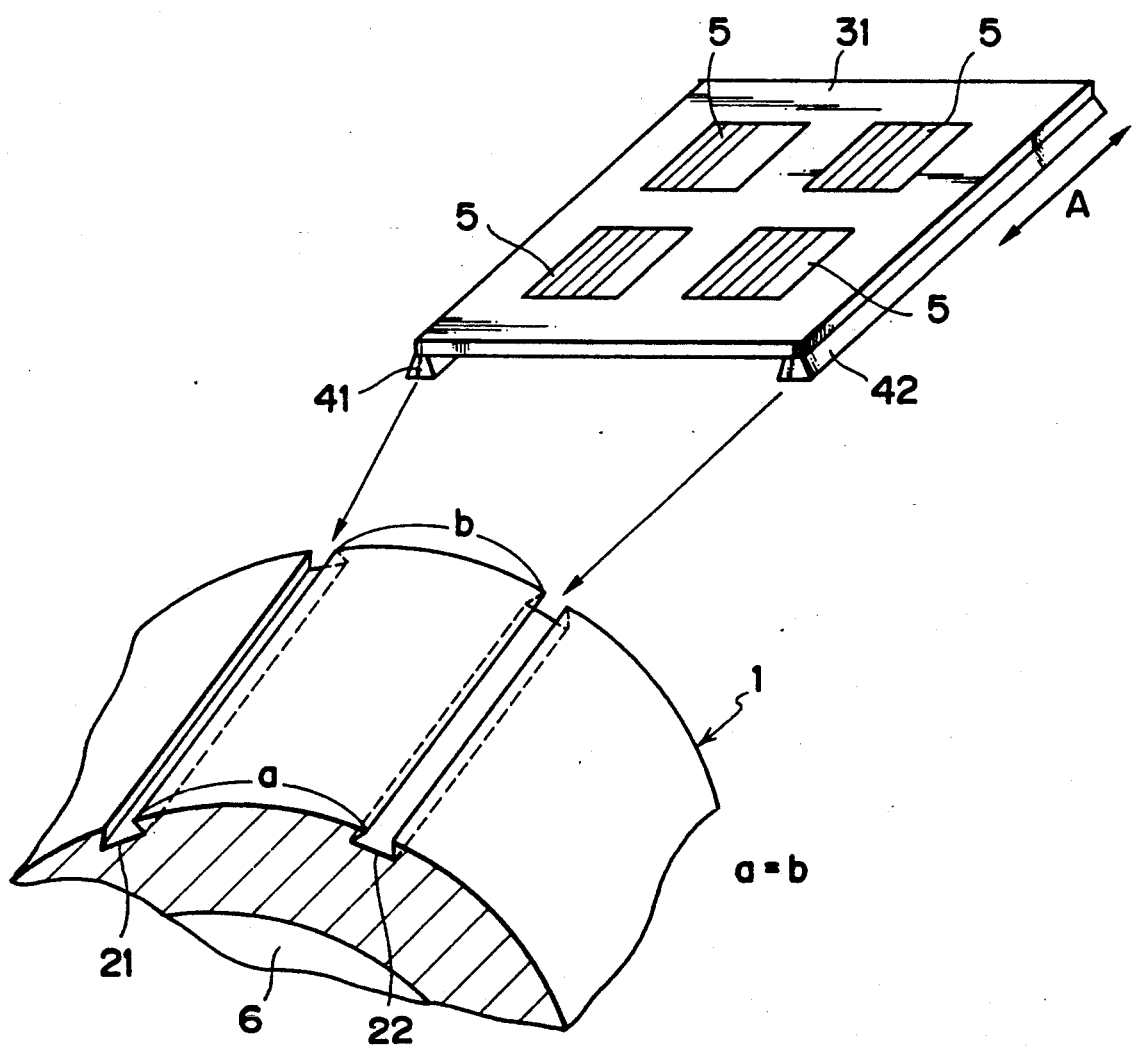
FIG. 2 roughly illustrates one of the embodiment of preparation of a roll-stamper of the present invention.

FIG. 1 and FIG. 2 roughly illustrate a roll-stamper for forming substrates of an information-recording medium of the present invention. In FIG. 1, the stampers 31 and 32 are fastened along the peripheral face of a mirror roller 1. On the stampers, preformat patterns 50 are formed which correspond to the preformat to be formed on the substrate of the information-recording medium. The stoppers 41 and 42 or 43 and 44 having a trapezoid section are bonded by the upper side to the back side of the stampers 31 or 32 along each edge parallel to the roller axis (direction "A" in FIG. 1). The mirror roller 1 has, on its peripheral face, stopping-grooves 21, 22, 23 and 24 which receive the stoppers 41–44 respectively, having nearly identical sections to those of the stoppers.

The interval between the stopping-grooves 21 and 22 along the periphery of the mirror roller 1 is equal to the interval between the stoppers 41 and 42 of the stamper 31, and the interval between the stopping-grooves 23 and 24 along the peripheral direction of the mirror roller 1 is equal to the interval between the stoppers 43 and 44 of the stamper 32. Thereby the two stoppers 41 and 42 can be inserted to the stopping-grooves 21 and 22 respectively to closely fasten the stamper 31 onto the peripheral face of the mirror roller 1. Also, the stoppers 43 and 44 can be slid into the stopping-grooves 23 and 24 respectively, thus the stamper 32 is similarly fastened to the mirror roller 1.

On fitting the mirror roller 1 with the stamper 31, the stoppers 41 and 42 are inserted into the stopping-grooves 21 and 22 respectively by sliding from the rim of the mirror roller 1 in the direction of the axis until both ends of the stamper 31 are in line with the rims of the mirror roller 1. To remove the fitted stamper 31 from the mirror roller 1, the stamper 31 is moved in the aforementioned axial direction to disengage the stoppers 41 and 42 from the mirror roller 1 through the rim. The stamper 32 may be engaged with and disengaged from the mirror roller 1 in the same process as above.

Figure 6A:
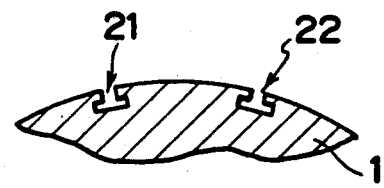
FIGS. 6A, 6B and 6C roughly illustrate a shape of a stopping-groove of the present invention.
Figure 6B:
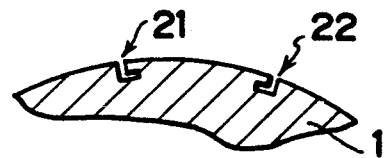
Figure 6C:
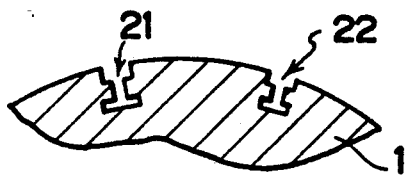

In the embodiment as shown in FIG. 1 and FIG. 2, the section of the stopper 41–44 and the stopping-grooves 21–24 is shaped as a trapezoid. The sectional shape of the stoppers and the stopping-grooves, however, is not limited thereto, but may be of any shape provided that the stoppers 41, 42, 43 and 44 can engage with the stopping-grooves 21, 22, 23 and 24 respectively making the stamper 31 and 32 immovable in the peripheral direction of the mirror roller 1 and in uniform contact with the peripheral face of the mirror roller 1. The examples of such shapes, for example, are an inversed T-shape, an L-shape, an I-shape, etc as shown in FIG. 6.

The intervals between the stopping-grooves 21 and 22 and between the stopping-grooves 23 and 24 along the periphery may be made slightly larger uniformly than the intervals between the stoppers 41 and 42 and between the stoppers 43 and 44 respectively within the range that the stoppers may be inserted into the stopping-grooves respectively. Thereby, the intervals between the stoppers 41 and 42, and between the stoppers 43 and 44 are extended by the insertion of the stampers (31, 32), increasing the tension of the stampers 31 and 32 in the periphery direction of the mirror roller 1, which further improves the degree of contact between the stampers 31 and 32, and the mirror roller 1.

Figure 3:
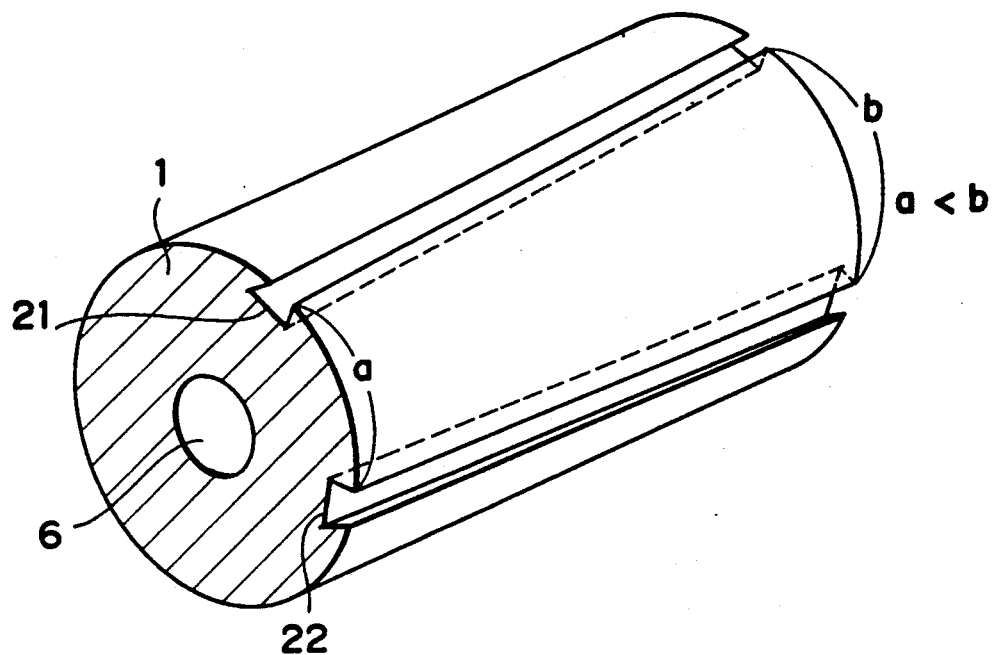
FIG. 3 roughly illustrates a mirror roller for another embodiment of the roll-stamper of the present invention.

Further, the space between the stopping-grooves (21, 22), or (23, 24) respectively corresponding to the stoppers (41, 42), or (43, 44) of the stampers may be tapered in the axial direction of the mirror roller 1 as shown in FIG. 3. In other words, the interval "b" between the stopping-grooves 21 and 22 at one end of the mirror roller may be made larger than the interval "a" thereof at the other end, namely a<b. In this case, insertion of the stamper 31 is easily done from the side "a" causing tension in the stamper along the peripheral direction of the mirror roller 1, leading to closer contact of the stamper with the mirror roller 1, whereby the transferability of the preformat onto a resin sheet is improved. The stampers 32 and 33 can also be engaged in the same manner.

The stoppers of the stamper 31 or 32 may be bonded to the stamper by any method insofar as the stamper does not fall off the stopper during and after the molding of resin sheets. For example, spot welding and silver soldering may be mentioned. The silver soldering is particularly preferable in consideration of the uniformity of the surface of the stamper.

The material for the stopper may be a heat-resistant resin, a metal, or the like. Especially a material having affinity to the stamper and a low thermal expansion coefficient is preferred. In this respect, stainless steel is especially suitable.

Figure 4:
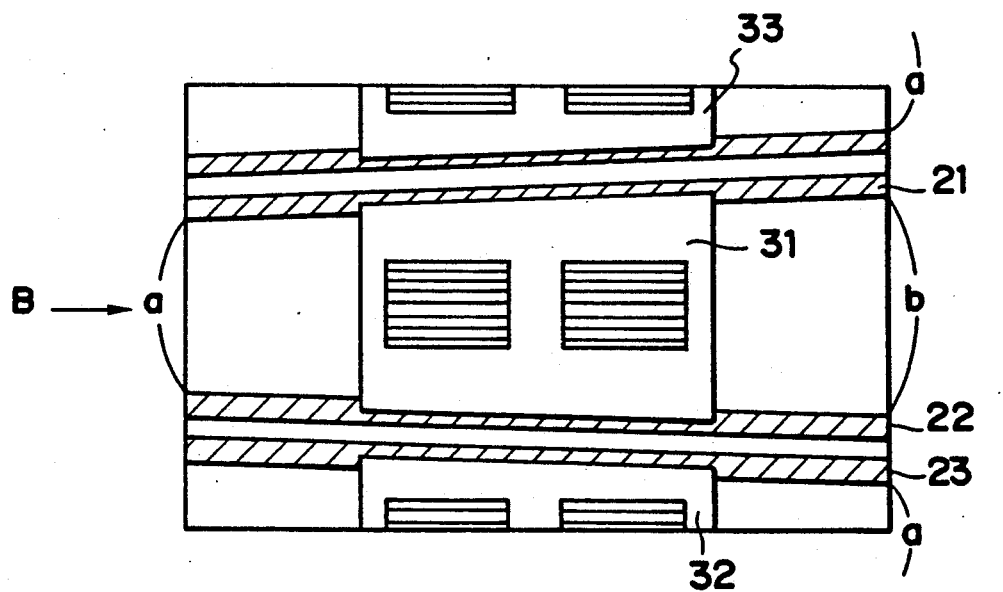
FIG. 4 illustrates a plan view of a roll-stamper of another embodiment of the present invention.

Although in FIG. 1, two stampers 31 and 32 are engaged with the mirror roller, the number of the stampers is not limited thereto, but may be one, or three as shown in FIG. 4, or more.

The stamper has preferably a thickness within a range from 50 μm to 500 μm in consideration of sufficient firmness and elasticity, and avoidance of the enlargement of the diameter of the roll-stamper 10.

The preformat pattern 50 to be formed on the stamper of the present invention for information-recording medium includes patterns corresponding to the specifically tracking grooves for optical discs and optical cards in spiral, concentric circles or parallel lines, for example, the lines of 0.5 $\mu$m to 2 $\mu$m in width, 1.0 $\mu$m to 5 $\mu$m in pitch, and 200 Å to 5000 Å in depth, or those of 2 $\mu$m to 5 $\mu$m in width, 8 $\mu$m to 15 $\mu$m in pitch, and 200 Å to 5000 Å in depth.

The back face of the stamper, particularly in the region corresponding to the preformat pattern 50 is preferably polished to a mirror state having a surface roughness of not more than 0.2 $\mu$m, or more preferably not more than 0.1 $\mu$m.

The peripheral face of the mirror roller employed in the present invention is preferably polished to a surface roughness of 0.2 $\mu$m or less, particularly 0.1 $\mu$m or less. The mirror roller 1 is preferably made of a material which is capable of being mirror-polished. The examples of the material includes aluminum, sintered hard alloy, mold steel such as maraging steel, and the like. Chromium steel is particularly preferable because of its readiness for mirror polishing. The mirror roller may possess a hollow 6 for circulation of a heating medium such as oil for heating the preformat roll. In this case, the wall thickness of the mirror roller 1 is preferably in the range of 10 to 15 cm, and the depth of the stopping-grooves 21–24 is preferably in the range of 5 to 10 mm in consideration of the strength and size of the roll-stamper 10. The preferable diameter of the mirror roller is in a range from 100 to 500 mm.

The stopping-grooves 21–24 of the mirror roller 1 extend from one end to the other end of the mirror roller 1 as an example. However, the type of the stopping-grooves is not limited thereto in the present invention. The stopping-grooves may be of such a type that only one end of each groove reaches the rim of the mirror roller 1.

The stoppers 41, 42, 43, and 44 of the stampers 31 and 32 are not limited to be of a bar shape, but may be of discontinuous pieces placed at intervals. The respective stoppers 41, 42, 43, and 44 may be of a short length, and each of the stoppers 41, 42, 43, and 44 need not reach the end of the stampers 31 and 32.

A process of the continuous production of a substrate of information-recording medium is described below making reference to FIG. 5.

A thermoplastic resin 160 such as polycarbonate is extruded as a sheet from an extruder 100 through a T-die 120 connected thereto, rolling around the roll-stamper 10, and is pulled by a draw-off device 150 in a direction shown by an arrow mark C in the figure. While the resin sheet 160 is pressed between the roll-stamper 10 and pressure mirror rollers 110 and 130 opposing to the roll-stamper, the preformat patterns 50 on the stampers 31 and 32 are transferred onto the resin sheet 160 producing a substrate 140 for the information-recording medium. The molding machine is constituted such that the clearance between the two mirror press rollers 110 and 130 can be adjusted corresponding to the thickness of the substrate 140 for information-recording medium, and the temperatures of the rollers can be controlled independently.

As described above, according to the present invention a roll-stamper is provided in which a stamper will not peel off from the roller by action of heat used for transfer of a preformat pattern onto a resin sheet, and is satisfactory in durability. The stamper is free from the deformation which is usually caused by screw fixing of the stamper to the mirror roller, and free from the unevenness of the stamper at the screw-fixed points, so that the transferability of the preformat is improved, giving substrates of an information-recording medium of high quality without defective transfer nor birefraction thereof in high productivity.

Furthermore, according to the present invention, the stamper is fastened in closer contact with the mirror roll, allowing more precise transfer of the preformat patterns on a resin sheet.

The stamper on the mirror roller can be exchanged readily.

The present invention is explained in more detail making reference to Examples.

EXAMPLE 1

Photoresist AZ-1300 (made by Hoechst Japan K. K.) was applied in a thickness of 300 nm onto a previously mirror-polished square glass plate having a side length of 300 mm and a thickness of 10 mm. On the surface of the resulting resist layer, four identical preformat patterns corresponding to optical-card striped track-grooves of 3 $\mu$m in groove breadth and 12 $\mu$m in pitch were engraved by a laser cutting machine at four places of 80 mm×30 mm respectively. After development treatment, a nickel film layer was formed on the resist layer by sputtering to a thickness of 100 nm. Further, nickel was deposited thereon by electroforming in a thickness of 200 $\mu$m. The nickel film was peeled off from the resist layer. Subsequently, the back surface of the nickel film not transferred preformat pattern was mirror-polished, and finished to a thickness of 150 $\mu$m and a polished surface roughness of 0.1 $\mu$m. Thus a stamper 31 as shown in FIG. 2 was formed. The stamper 32 of the same constitution as the stamper 31 was also formed in the same manner. Finally, along each edge, on the back face of the stampers 31 and 32, two stainless steel stoppers 41 and 42, or 43 and 44, of 10 mm wide in upper side, 15 mm wide in lower side, 5 mm in height, and 300 mm in length were fastened by the upper sides by silver soldering to the stampers 31 or 32, respectively.

On the other hand, a mirror roller 1 of 300 mm in diameter and 300 mm in width was prepared by plating chromium on a peripheral surface of a steel cylinder, and by mirror-polishing it to have a surface roughness of 0.1 $\mu$m or less. Subsequently, on the peripheral face of the mirror roller 1, four stopping-grooves 21 to 24 were formed each having a trapezoidal section of upper side width of 10.05 mm, lower side width of 15.05 mm, and depth of 5 mm.

At one of the rims the intervals between the stopping-grooves 21 and 22, and between the stopping-grooves 23 and 24 were made 280 mm (=a), equal to the intervals between the stoppers 41–42 and 43–44 (a=280 mm) of the both stampers 31 and 32, and at the other rim the intervals were made wider than the above by 100 $\mu$m (b=280.1 mm), thereby the interval between the stoppers 21 and 22 or between the stoppers 23 and 24 widens toward the other rim along the axis of the mirror roller 1. The stampers 31 and 32 were fastened to the mirror roller 1 by inserting the stoppers 41 and 42 and the stoppers 43 and 44 from the side "a" respectively into the stopping-grooves 21 and 22 and grooves 23 and 24 to prepare a roll-stamper 10.

Figure 5:
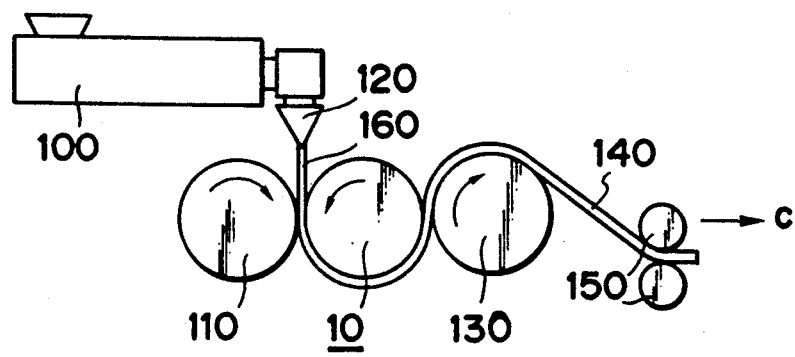
FIG. 5 roughly illustrates an apparatus of the present invention for producing substrates of an information-recording medium.

This roll-stamper 10 was mounted on a molding apparatus as shown in FIG. 5. A polycarbonate resin was extruded by the extruder 100 to prepare a substrate 140 of 0.4 mm thickness for optical cards. The substrates corresponding to 1000 sheets of optical cards were formed under the molding conditions of T-die temperature of 280°-320° C., the surface temperature of the roll-stamper of 140° C., and delivery rate of the resin sheet of 4 m/min.

During the substrate production, neither peeling-off nor bulging-out of the stamper 31 or 32 from the mirror roller 1 was observed.

The optical card substrates were examined on the transferability of the preformat patterns and the occurrence of birefraction according to the methods and criterion shown below. As a result, the transferability was excellent and the birefraction was 20 nm or less at any point.

Figure 9:
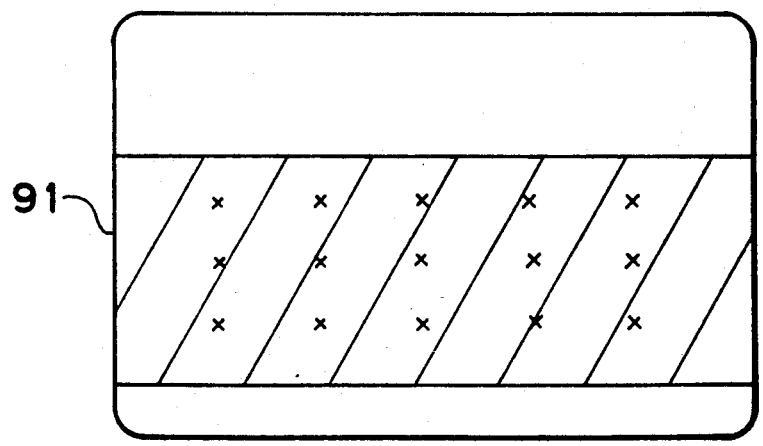
FIG. 9 shows an optical card having a preformat pattern thereon produced by a roll stamper of the present invention.

The transfer accuracy was estimated using laser microscopy determining the width of the land (between two grooves) of the tracks at 15 points (x marks) within the transferred pattern 91 as shown in FIG. 9, on each optical card. When the variation of the width was within ±0.1 μm, the transfer accuracy was estimated as excellent. The birefraction was measured at the above-mentioned 15 spots, using the light of wavelength 830 nm and of spot diameter 1 mm by a single pass. When the value of birefraction was 20 nm or less at every spot measured, it was estimated as excellent.

EXAMPLE 2

Figure 7:
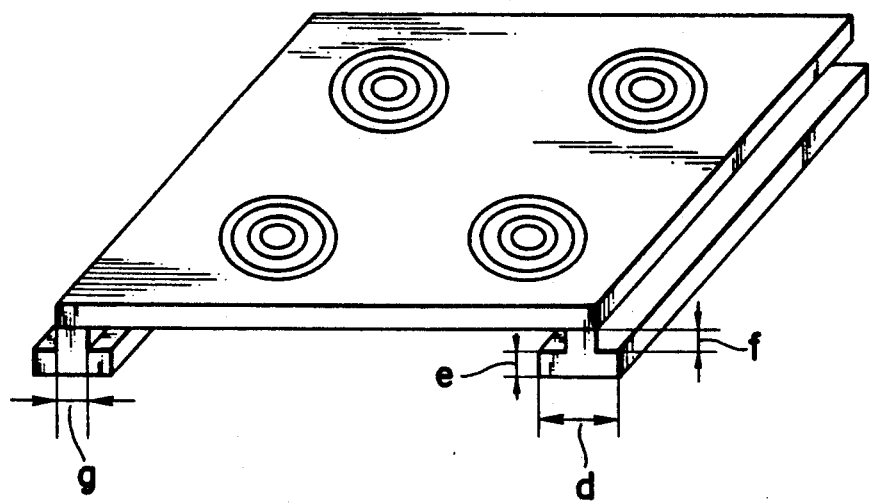
FIG. 7 roughly illustrates still another embodiment of a stamper for the roll-stamper of the present invention.

A stamper 31 having four identical preformat patterns each corresponding to an optical disc as shown in FIG. 7 was prepared in the same manner as in Example 1. The optical disc pattern consists of the concentric optical disc track grooves having groove breadth of 0.6 μm, pitch of 1.6 μm, depth of 1000 Å and the circular diameter of 9 cm.

The stoppers 41 and 42 were made of stainless steel each having a sectional shape of an inversed T as shown in FIG. 7, and were fastened along both edges on the back side of the stamper 31 by silver soldering. The dimensions of the stopper having an inversed T shape were: d=15 mm, e=10 mm, f=5 mm, and g=5 mm, and the length thereof was 300 mm. In the same process the stamper 32 was prepared, and the stoppers 43 and 44 were bonded thereto.

A mirror roller was prepared in the same process as in Example 1. On the peripheral face thereof, the stopping-grooves 21 to 24 having a sectional shape of inversed T as shown in FIG. 6A in parallel with the axis of the mirror roller. The dimensions of the stopping-groove section corresponding to respective dimensions of the stopper were: d'=15.1 mm, e'=10.1 mm, f'=5 mm, and g'=5.05 mm.

Two pairs of stopping-grooves 21 and 22, and 23 and 24 were formed, each having an even interval: a=269.8 mm and a=b.

With the roll-stamper 10 prepared thus, a molding apparatus for optical disc substrates production was prepared in the same process as in Example 1. With this apparatus, a polycarbonate resin was molded into optical disc substrates of 1.2 mm thick continuously, which correspond to 1000 sheets of optical discs.

The resulting optical disc substrates were evaluated by the same criterion as in Example 1. As a result, the transferability was satisfactory, and the birefraction was not more than 20 nm in every point.

COMPARATIVE EXAMPLE 1

The stampers 31 and 32 prepared in Example 1 were bonded with a cyanoacrylate adhesive (trade name; SC-55, SONY Chemicals Inc.) on the peripheral face of the mirror roller 1 to provide a roll-stamper. Optical card substrates were formed continuously with this roll-stamper. When the substrates corresponding to 600 sheets of the optical cards were formed, the stampers 31 and 32 peeled off from the mirror roller.

COMPARATIVE EXAMPLE 2

Figure 8:
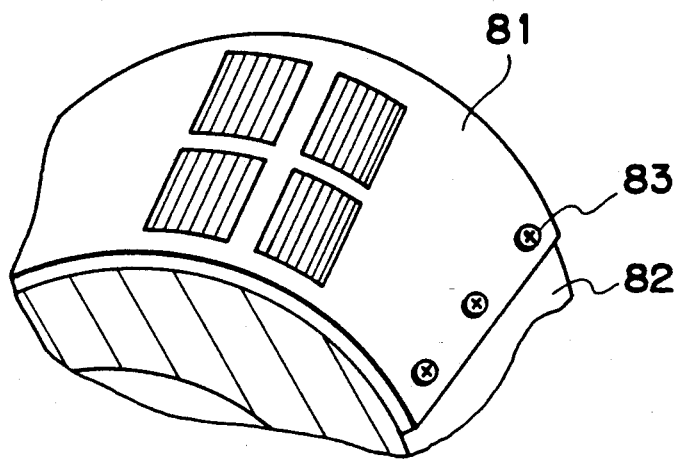
FIG. 8 roughly illustrates a conventional roll-stamper.

The roll-stampers 31 and 32 prepared in Example 1 were fastened with screws onto the mirror roller 1 as shown in FIG. 8 to provide a roll-stamper. Optical card substrates were prepared with this roll-stamper. The resulting optical card substrates were evaluated by the same criterion as in Example 1.

As a result, the width of the land varied in a range of 8.6 to 9.5 μm, and the transfer accuracy was low. The birefraction more than 40 nm was observed at several points.

What is claimed is:

1. A roll-stamper for forming substrates of an information-recording medium, which comprises at least one stamper being fastened along a peripheral face of a mirror roller, said stamper having on a front side patterns each corresponding to a preformat for an information recording medium, and having stoppers fixed along both edges on a reverse side thereof, and being fastened to the mirror roller by inserting said stoppers into negative stopping-grooves cut into the mirror roller in parallel with an axial direction of the mirror roller, wherein
    said stoppers and the stopping-grooves have a cross-sectional profile preventing said stamper from peeling off the surface of the mirror roller.

2. The roll-stamper of claim 1, wherein each stopper and stopping groove has a trapezoidal cross-section.

3. A roll-stamper for forming substrates of an information-recording medium, which comprises at least one stamper being fastened along a peripheral surface of a mirror roller, said stamper having on a front side patterns each corresponding to a preformat for an information recording medium, and having stoppers fixed along both edges on a reverse side thereof, and being fastened to the mirror roller by inserting said stoppers into negative stopping-grooves cut into the mirror roller along the axis of the mirror roller, wherein
    a pair of the negative stopping-grooves for receiving said stoppers of said stamper are cut into the mirror roller such that the space between the stopping-grooves is tapered along the axial direction of the mirror roller.

4. An apparatus for continuously producing substrates of an information-recording medium, comprising:
    extruding means for forming a resin sheet by extruding a resin;
    a roll-stamper carrying preformat patterns on a front side for transferring the preformat patterns onto the resin sheet; and
    at least one pressure mirror roller opposing said roll-stamper, wherein
    said roll-stamper comprises at least one thin stamper having stoppers fixed along both edges on a reverse side thereof, and being fastened onto a mirror roller by inserting said stoppers into negative stopping-grooves cut into said mirror roller along the axial direction of said mirror roller, wherein
    said stoppers and said stopping-grooves have a cross-sectional profile for preventing said stamper from peeling off said surface of said mirror roller.

5. The roll-stamper of claim 1, wherein the cross-section of each stopper and stopping-groove is one of either an inverted T shape, L shape and I-shape.

6. The roll-stamper of claim 1, wherein said stopper is stainless steel.

7. The roll-stamper of claim 1, wherein said stopper is fixed to said stamper with silver soldering.

8. The roll-stamper of claim 1, wherein the patterns on said surface of said stamper correspond to tracking grooves of an optical card.

9. The roll-stamper of claim 1, wherein the patterns on said surface of said stamper correspond to striped tracking grooves of an optical card of 0.5–2 μm in width, 1.0–5 μm in pitch, and 200–5000 Å in depth.

10. The roll-stamper of claim 1, wherein the patterns on said surface of said stamper correspond to striped tracking grooves of an optical card of 2–5 μm in width, 8–15 μm in pitch, and 200–5000 Å in depth.

11. The roll-stamper of claim 1, wherein the patterns on said surface of said stamper correspond to spiral or concentric circular tracking grooves of an optical card of 0.2–5 μm in width, 1–5 μm in pitch, and 200–5000 Å in depth.

12. The roll-stamper of claim 1, wherein the stopping groove is 5–10 mm deep.

13. The roll-stamper of claim 3, wherein said stopper and the stopping grooves provide a cross-section which prevents said stamper from peeling off of the surface of the mirror roller.

14. The roll-stamper of claim 13, wherein said stopper and the stopping-grooves define a trapezoidal cross-section.

15. The roll-stamper of claim 13, wherein the cross-section of each stopper and stopping-groove is either one of an inverted T-shape, L-shape and I-shape.

16. The roll-stamper of claim 3, wherein said stopper is stainless steel.

17. The roll-stamper of claim 3, wherein said stopper is fixed to said stamper with silver soldering.

18. The claim-stamper of claim 3, wherein the patterns on said surface of said stamper correspond to tracking grooves of an optical card.

19. The roll-stamper of claim 3, wherein the patterns on said surface of said stamper correspond to striped tracking grooves of an optical card of 0.5–2 μm in width, 1.0–5 μm in pitch, and 200–5000 Å in depth.

20. The roll-stamper of claim 3, wherein the patterns on said surface of said stamper correspond to striped tracking grooves of an optical card of 2–5 μm in width, 8–15 μm in pitch, and 200–5000 Å in depth.

21. The roll-stamper of claim 3, wherein the patterns on said surface of said stamper correspond to spiral or concentric circular tracking grooves of an optical card of 0.2–5 μm in width, 1–5 μm in pitch, and 200–5000 Å in depth.

22. The roll-stamper of claim 3, wherein the stopping groove is 5–10 mm deep.

23. The apparatus of claim 4, wherein the patterns on said surface of said stamper correspond to tracking grooves of an optical card.

24. The apparatus of claim 4, wherein the patterns on said surface of said stamper correspond to striped tracking grooves of an optical card of 0.5–2 μm in width, 1.0–5 μm in pitch, and 200–5000 Å in depth.

25. The apparatus of claim 4, wherein the patterns on said surface of said stamper correspond to striped tracking grooves of an optical card of 2–5 μm in width, 8–15 μm in pitch, and 200–5000 Å in depth.

26. The apparatus of claim 4, wherein the patterns on said surface of said stamper correspond to spiral or concentric circular tracking grooves of an optical card of 0.2–5 μm in width, 1–5 μm in pitch, and 200–5000 Å in depth.

27. An apparatus for continuously producing substrates of an information-recording medium, comprising:
means for forming a resin sheet by extruding a resin;
a roll-stamper carrying preformat patterns on a front side for transferring the preformat patterns onto the resin sheet;
at least one pressure mirror roller opposing said roll-stamper, wherein said roll-stamper comprises at least one thin stamper having stoppers fixed along both edges on a reverse side thereof and being fastened onto a mirror roller by inserting said stoppers into negative stopping-grooves cut into said mirror roller in an axial direction thereof, wherein
a space defined between said stopping-grooves is tapered along an axial direction of said mirror roller.

28. The apparatus of claim 27, wherein the patterns on said surface of said stamper correspond to tracking grooves of an optical card.

29. The apparatus of claim 27, wherein the patterns on said surface of said stamper correspond to striped tracking grooves of an optical card of 0.5–2 μm in width, 1.0–5 μm in pitch, and 200–5000 Å in depth.

30. The apparatus of claim 27, wherein the patterns on said surface of said stamper correspond to striped tracking grooves of an optical card of 2–5 μm in width, 8–15 μm in pitch, and 200–5000 Å in depth.

31. The apparatus of claim 27, wherein the patterns on said surface of said stamper correspond to spiral or concentric circular tracking grooves of an optical card of 0.2–5 μm in width, 1–5 μm in pitch, and 200–5000 Å in depth.

* * * * *

UNITED STATES PATENT AND TRADEMARK OFFICE
CERTIFICATE OF CORRECTION

PATENT NO. : 5,173,313
DATED : December 22, 1992
INVENTOR(S) : Tetsuya Sato, et al.

It is certified that error appears in the above-indentified patent and that said Letters Patent is hereby corrected as shown below:

COLUMN 2:

Line 34, "roll." should read --roller.--.

COLUMN 9:

Line 41, "claim-stamper" should read --roll-stamper--.

Signed and Sealed this

Fourth Day of January, 1994

Attest:

BRUCE LEHMAN

*Attesting Officer*     Commissioner of Patents and Trademarks